(12) United States Patent
Ohtomo et al.

(10) Patent No.: US 10,697,758 B2
(45) Date of Patent: Jun. 30, 2020

(54) LASER REMOTE LENGTH MEASUREMENT INSTRUMENT

(71) Applicant: TOPCON CORPORATION, Itabashi-ku, Tokyo (JP)

(72) Inventors: Fumio Ohtomo, Asaka (JP); Kaoru Kumagai, Itabashi (JP)

(73) Assignee: TOPCON CORPORATION, Itabashi-ku, Tokyo (JP)

( * ) Notice: Subject to any disclaimer, the term of this patent is extended or adjusted under 35 U.S.C. 154(b) by 306 days.

(21) Appl. No.: 15/636,767

(22) Filed: Jun. 29, 2017

(65) Prior Publication Data

US 2018/0023944 A1 Jan. 25, 2018

(30) Foreign Application Priority Data

Jul. 19, 2016 (JP) .................................. 2016-141454

(51) Int. Cl.
| | |
|---|---|
| *G01C 3/08* | (2006.01) |
| *G01B 11/02* | (2006.01) |
| *G01S 7/48* | (2006.01) |
| *G01S 17/42* | (2006.01) |
| *G01S 7/481* | (2006.01) |
| *G01S 17/08* | (2006.01) |

(52) U.S. Cl.
CPC .......... *G01B 11/026* (2013.01); *G01S 7/4808* (2013.01); *G01S 7/4817* (2013.01); *G01S 17/08* (2013.01); *G01S 17/42* (2013.01)

(58) Field of Classification Search
CPC ... G01B 11/026; G01S 7/4817; G01S 7/4808; G01S 17/42; G01S 17/08

USPC ....................................................... 356/4.01
See application file for complete search history.

(56) References Cited

U.S. PATENT DOCUMENTS

| | | | |
|---|---|---|---|
| 4,313,654 A | 2/1982 | Matsui et al. | |
| 8,319,952 B2 | 11/2012 | Otani et al. | |
| 8,798,959 B2 | 8/2014 | Mahajan | |
| 9,619,433 B2 | 4/2017 | Fujita et al. | |

(Continued)

FOREIGN PATENT DOCUMENTS

| | | |
|---|---|---|
| JP | 2013167508 A | 8/2013 |
| JP | 2013181758 A | 9/2013 |
| JP | 2016151422 A | 8/2016 |

*Primary Examiner* — Mark Hellner
(74) *Attorney, Agent, or Firm* — Chiesa Shahinian & Giantomasi PC

(57) ABSTRACT

A laser remote length measurement instrument capable of remotely measuring a length between two required points in a non-contact manner is provided. The laser remote length measurement instrument includes a rangefinding unit, an optical axis deflection section, a rotation angle detector, and a computation controller. The rangefinding unit is configured to cause a light emitting element to emit visible rangefinding light and obtain a light reception signal. The optical axis deflection section is configured to scan to-and-fro between two directions with the rangefinding light. The rotation angle detector is configured to detect a divergence angle between the two directions. The computation controller is configured to compute a distance between illuminated points in the two directions illuminated with the rangefinding light on the basis of rangefinding results for the illuminated points and the divergence angle between the two directions.

19 Claims, 13 Drawing Sheets

(56) References Cited

U.S. PATENT DOCUMENTS

| | | | |
|---|---|---|---|
| 2012/0062867 A1* | 3/2012 | Shibatani | G01C 3/085 356/4.01 |
| 2015/0019164 A1 | 1/2015 | Fujita et al. | |
| 2015/0204976 A1* | 7/2015 | Bosch | G01B 11/26 356/4.01 |
| 2016/0238385 A1 | 8/2016 | Ohtomo et al. | |

* cited by examiner

LASER REMOTE LENGTH MEASUREMENT INSTRUMENT

BACKGROUND

1. Technical Field

The present invention relates to a laser remote length measurement instrument for measuring the length of a measurement target object.

2. Related Art

In construction, measurements are frequently made of the length of each measurement target object of a structure, such as lengths of ceilings, floors, pillars, and wall surfaces.

The above measurements of the lengths of each measurement target object of a structure are performed in the related art by running a tape measure (measuring tape) across from one end to the other end of the measurement target object. Further, in recent years, a laser rangefinder is set at one end of a measurement target object and the distance to the other end thereof is measured using the laser rangefinder.

However, two or more operatives are required to hold a tape measure in order to perform measurements with the tape measure. Positioning of the tape measure or laser rangefinder also needs to be performed at least at one end of the measurement target object when using either a tape measure or a laser rangefinder. Thus, to measure a measurement target object at a position not reachable by an operative, such as a ceiling, there is a need to use a step ladder or the like to bring an operative near the measurement target object so as to enable measurement operations, giving rise to poor operability. (See the specification of U.S. Patent Publication No. 2015/0204976).

SUMMARY

The invention provides a laser remote length measurement instrument capable of measuring a length between two required points remotely and in a non-contact manner.

An aspect of the invention relates to a laser remote length measurement instrument including a rangefinding unit, an optical axis deflection section, a rotation angle detector, and a computation controller. The rangefinding unit is configured to cause a light emitting element to emit visible rangefinding light and obtain a light reception signal. The optical axis deflection section is configured to scan to-and-fro between two directions with the rangefinding light. The rotation angle detector is configured to detect a divergence angle between the two directions. The computation controller is configured to compute a distance between illuminated points in the two directions illuminated with the rangefinding light, on the basis of rangefinding results for the illuminated points and the divergence angle between the two directions.

An aspect of the invention also relates to a laser remote length measurement instrument wherein the optical axis deflection section is a scanning mirror, and the computation controller rotationally oscillates the scanning mirror to-and-fro at a required rotation angle.

An aspect of the invention also relates to a laser remote length measurement instrument wherein the optical axis deflection section includes a pair of optical prisms that have a circular plate shape and are independently rotatable and overlap with each other. In such a laser remote length measurement instrument, each of the pair of optical prisms includes a rangefinding light axis deflection section formed at a central portion of each of the pair of optical prisms and configured to deflect the rangefinding light at a required deflection angle and in a required direction, and a reflected rangefinding light axis deflection section formed at an outer circumferential portion of each of the pair of optical prisms and configured to deflect the reflected rangefinding light at a deflection angle and a direction identical to those of the rangefinding light axis deflection section. The computation controller independently rotates each of the pair of optical prisms.

An aspect of the invention also relates to a laser remote length measurement instrument wherein each of the pair of optical prisms configuring the optical axis deflection section is a Fresnel prism.

An aspect of the invention also relates to a laser remote length measurement instrument further including an orientation detection device capable of detecting an inclination angle and inclination direction with respect to the vertical or the horizontal.

An aspect of the invention also relates to a laser remote length measurement instrument further including a beam manipulation section configured to increase or decrease the divergence angle between the two directions.

An aspect of the invention also relates to a laser remote length measurement instrument wherein the computation controller continuously flashes the rangefinding light and scans with the rangefinding light.

An aspect of the invention also relates to a laser remote length measurement instrument wherein the computation controller flashes the rangefinding light on and off and scans with the rangefinding light.

Moreover, an aspect of the invention also relates to a laser remote length measurement instrument wherein the computation controller only flashes the rangefinding light when the rangefinding light is at the illuminated points in the two directions.

According to an aspect the invention, a laser remote length measurement instrument includes a rangefinding unit, an optical axis deflection section, a rotation angle detector, and a computation controller. The optical axis deflection section is configured to cause a light emitting element to emit visible rangefinding light and obtain a light reception signal. The optical axis deflection section is configured to scan to-and-fro between two directions with the rangefinding light. The rotation angle detector is configured to detect a divergence angle between the two directions. The computation controller is configured to compute a distance between illuminated points in the two directions illuminated with the rangefinding light on the basis of rangefinding results for the illuminated points and the divergence angle between the two directions. An aspect of the invention accordingly exhibit the advantageous effect of enabling easy measurement of the distance between the illuminated points in a non-contact manner, even for a measurement target object in an unreachable position, such as the ceiling of a structure, enabling operation time to be shortened and the operability to be improved.

DESCRIPTION OF EMBODIMENTS

A description follows regarding embodiments of the invention, with reference to the drawings.

Figure 1:
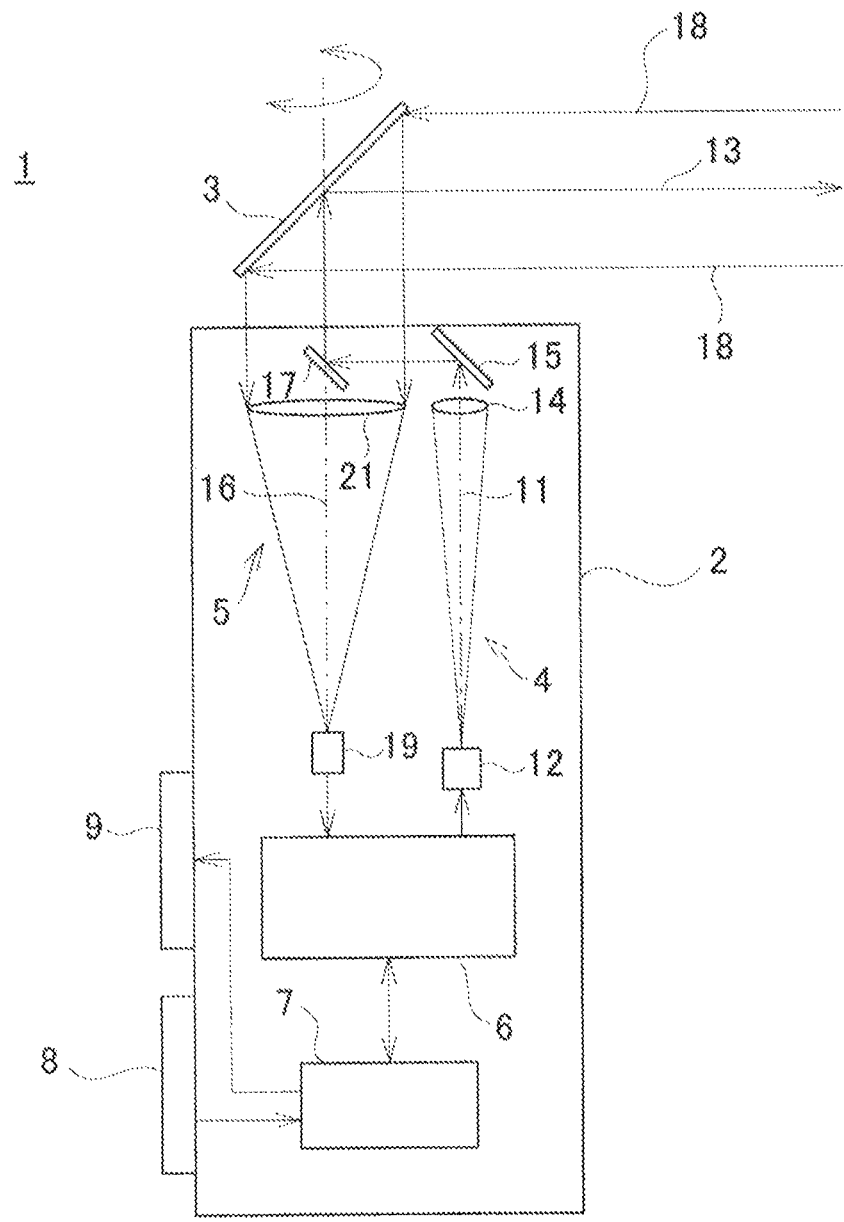
FIG. 1 is an outline diagram illustrating an optical system of a laser remote length measurement instrument according to a first embodiment of the invention.
Figure 2:
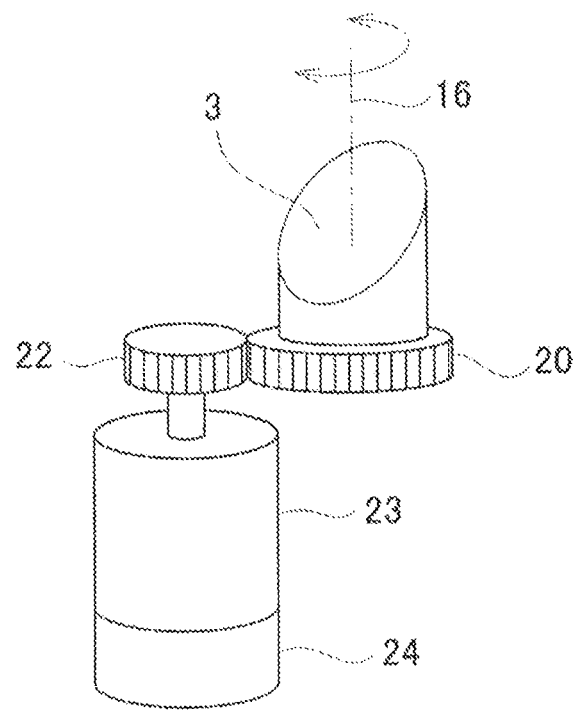
FIG. 2 is a perspective view illustrating a scanning mirror and the periphery thereof.

First, a description follows regarding a laser remote length measurement instrument according to a first embodiment of the invention, with reference to FIG. 1 and FIG. 2.

A laser remote length measurement instrument 1 includes a measurement device body 2, and a scanning mirror 3 serving as an optical axis deflection section. Note that the laser remote length measurement instrument 1 is capable of being held in one hand (is handheld).

A rangefinding light emitting section 4, a rangefinding light receiving section 5, a rangefinding unit 6, and a computation controller 7 are integrated together and housed inside the measurement device body 2. An operation unit 8 and a display unit 9 are also provided at required positions on the measurement device body 2. Note that the display unit 9 may be a touch panel that also serves as the operation unit 8.

The rangefinding light emitting section 4 has an emission optical axis 11. A light emitting element 12, such as a laser diode (LD), is provided on the emission optical axis 11 and emits rangefinding light 13, such as visible light. A projection lens 14 is also provided on the emission optical axis 11 to collimate the rangefinding light 13 into a parallel beam. Further, the emission optical axis 11 is deflected by a first reflection mirror 15, serving as a deflection optical member provided on the emission optical axis 11, and by a second reflection mirror 17, serving as a deflection optical member provided on a reception optical axis 16 (described later) that is the body reference axis, such that the emission optical axis 11 coincides with the reception optical axis 16.

Moreover, the scanning mirror 3 deflects the emission optical axis 11 at a right angle so that the emission optical axis 11 faces toward the direction of a measurement target object. An emission optical axis deflection section is configured by the scanning mirror 3, the first reflection mirror 15, and the second reflection mirror 17. The measurement target object is illuminated with the rangefinding light 13 emitted from the light emitting element 12 and passing through the emission optical axis deflection section.

The rangefinding light receiving section 5 has the reception optical axis 16. Reflected rangefinder light 18 that has been reflected by a measurement point (illuminated point) is made incident on the rangefinding light receiving section 5 via the scanning mirror 3.

An imaging lens 21 is disposed on the reception optical axis 16. A light receiving element 19 such as a photodiode (PD) is provided on the imaging side of the imaging lens 21. The imaging lens 21 forms an image of the reflected rangefinder light 18 on the light receiving element 19. The light receiving element 19 receives the reflected rangefinder light 18 and generates a light reception signal. The light reception signal is input to the rangefinding unit 6. Note that the second reflection mirror 17 has a diameter smaller than the imaging lens 21 and of a size capable of reflecting the rangefinding light 13.

Moreover, the scanning mirror 3 is disposed on the reception optical axis 16 (namely, on the emission optical axis 11) at the object side of the imaging lens 21. The scanning mirror 3 is rotatable about the reception optical axis 16 (namely, about the emission optical axis 11).

A driven gear 20 is provided at the lower end of the scanning mirror 3 (see FIG. 2). The driven gear 20 meshes with a drive gear 22 provided at the leading end of a drive shaft of a motor 23 such that the scanning mirror 3 is rotated by the motor 23. The rotation angle of the scanning mirror 3 is detected by a rotation angle detector such as an encoder 24. The encoder 24 generates a detection signal, and the detection signal is input to the computation controller 7.

The rangefinding unit 6 controls the light emitting element 12, and causes a laser beam to be emitted as the rangefinding light 13. The rangefinding light 13 is deflected onto the reception optical axis 16 by the first reflection mirror 15 and the second reflection mirror 17, and is then deflected at a right angle so as to face toward a measurement point by the scanning mirror 3.

The reflected rangefinder light 18 that has been reflected at the measurement point is made incident on the measurement device body 2 by the scanning mirror 3, and is formed into an image on the light receiving element 19 by the imaging lens 21. The light receiving element 19 outputs a light reception signal to the rangefinding unit 6. The rangefinding unit 6 measures the range to the measurement point on the basis of the light reception signal. The rangefinding result of the measurement point is input to the computation controller 7.

The computation controller 7 is configured by an input-output control unit, a central processing unit (CPU), a storage unit, and the like. The storage unit is stored with programs such as: a rangefinding program for controlling rangefinding operations; a control program for controlling rotation of the scanning mirror 3; a distance computation program for computing a distance between two points on the basis of rangefinding results of two optional measurement points and a rotation angle of the scanning mirror 3 performing oscillating rotation to-and-fro between the two points, namely, the divergence angle between the two points; and a display program for displaying rangefinding data, distance data, and the like on the display unit 9. Moreover, the storage unit is stored with measurement results such as rangefinding data and distance data.

Figure 3:
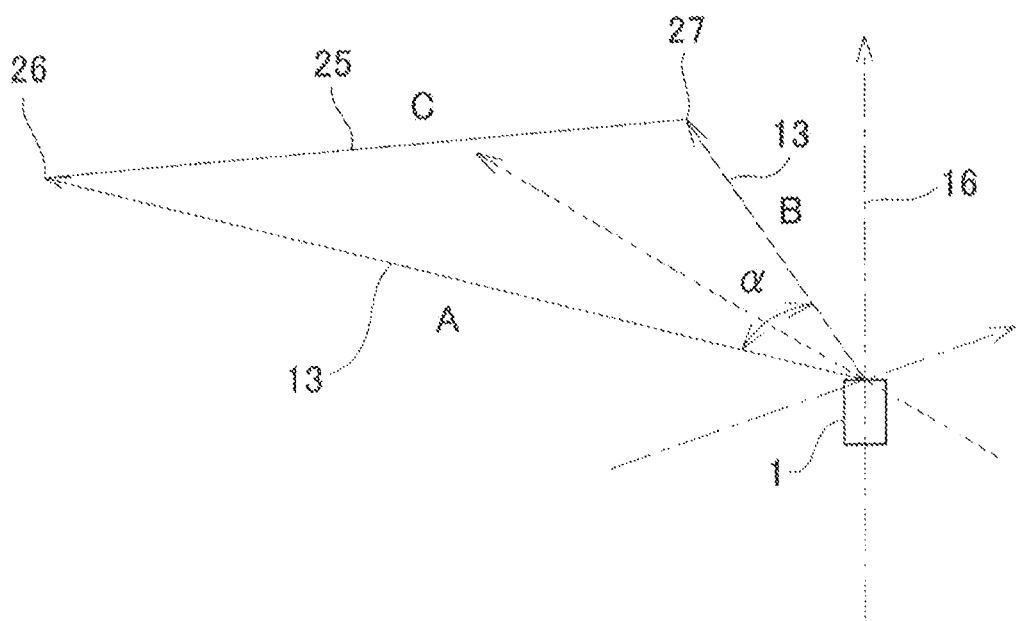
FIG. 3 is an explanatory diagram illustrating measurement of distance between two points using the laser remote length measurement instrument.

Next, a description follows regarding measurement operations by the laser remote length measurement instrument 1, with reference to FIG. 3.

First, the rangefinding light 13 is emitted from the light emitting element 12. The rangefinding light 13 is collimated into a parallel beam by the projection lens 14, and emitted toward measurement points via the scanning mirror 3.

The reflected rangefinder light 18 that has been reflected by the measurement point is made incident on the measurement device body 2 by the scanning mirror 3, and is focused onto the light receiving element 19 by the imaging lens 21. Note that the optical axis of the reflected rangefinder light 18 is deflected by the scanning mirror 3 so as to coincide with the reception optical axis 16.

Note that while the rangefinding light 13 is being emitted by the light emitting element 12, the scanning mirror 3 is rotationally oscillated to-and-fro over a predetermined rotation angle such that the divergence angle is a. As a result, the laser remote length measurement instrument 1 can scan along a straight line path 25 with the rangefinding light 13, as illustrated in FIG. 3. The path 25 can be made visible as a straight line by making the duration of to-and-fro scanning not greater than the duration of a visual after image. The brightness can be raised and the visibility can be improved by flashing the rangefinding light 13 on and off. Alternatively, the brightness can be further raised while also achieving power saving by only flashing the rangefinding light 13 at the two ends of the path 25.

To measure the length of a measurement target object such as a ceiling of a structure, two optional points are taken on a measurement target object, for example a first measurement point 26 and a second measurement point 27. The direction and tilt of the laser remote length measurement instrument 1 are then adjusted, and the rotation angle of the scanning mirror 3 is also adjusted using the operation unit 8 such that the two ends of the path 25 coincide with the first measurement point 26 and the second measurement point 27. The rangefinding unit 6 measures a distance A to the first measurement point 26 and a distance B to the second measurement point 27, and finds a divergence angle α formed therebetween on the basis of a rotation angle detected by the encoder 24.

The computation controller 7 computes a distance C between the first measurement point 26 and the second measurement point 27 on the basis of the distance A, the distance B, and the divergence angle α. The distance C can be found using the following Equation (1).

$$C=\sqrt{(A^2+B^2-2AB\cos\alpha)} \quad (1)$$

The computed distance C is displayed on the display unit 9.

As stated above, in the first embodiment, two optional points on the measurement target object are set as the first measurement point 26 and the second measurement point 27. The direction and tilt of the laser remote length measurement instrument 1 and the rotation angle of the scanning mirror 3 are then adjusted such that the two ends of the path 25 coincide with the first measurement point 26 and the second measurement point 27. This enables the distance between the first measurement point 26 and the second measurement point 27 to be measured.

Thus, the distance between two points can be measured in a non-contact manner without an operative approaching a measurement target object. The distance between two points can accordingly be easily measured even in cases in which the measurement target object, such as the ceiling of a structure, is positioned out of reach. This enables operation time to be shortened and the operability to be improved.

Further, the path 25 is formed by the visible rangefinding light 13, and so positional alignment of the two ends of the path 25 with the first measurement point 26 and the second measurement point 27 can be performed easily by eye, enabling operability to be improved.

Moreover, the laser remote length measurement instrument 1 is capable of being held in one hand (is handheld), and so adjustment can easily be made to the direction and tilt of the laser remote length measurement instrument 1, enabling the operability to be further improved.

Figure 4:
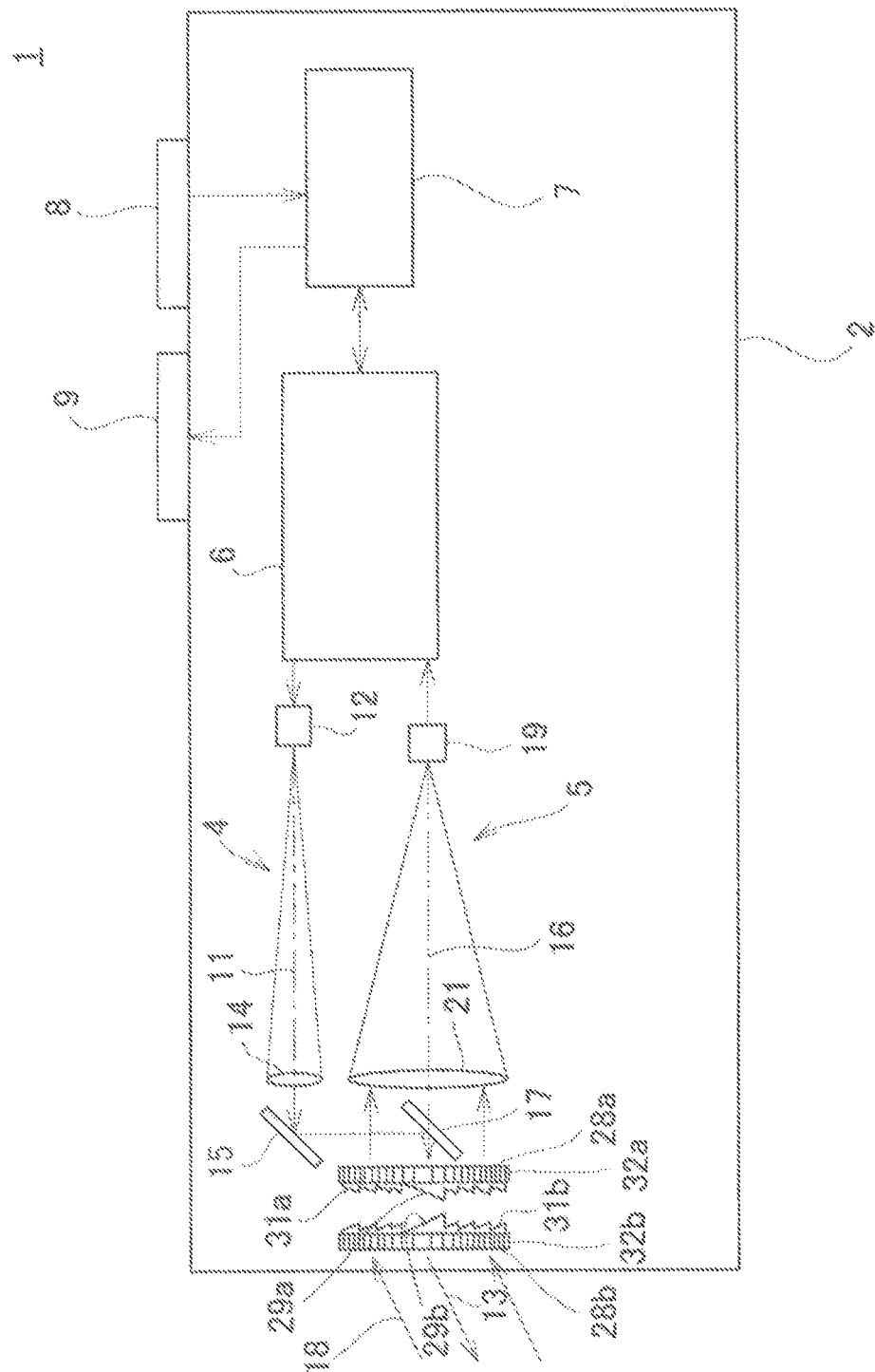
FIG. 4 is an outline diagram illustrating an optical system of a laser remote length measurement instrument according to a second embodiment of the invention.
Figure 5A:
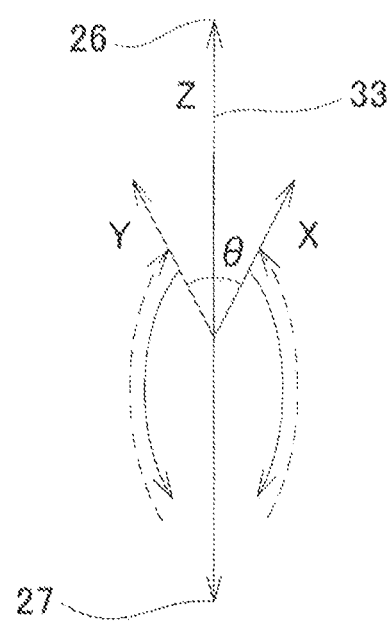
FIG. 5A is an explanatory diagram illustrating a scan direction of rangefinder light using the laser remote length measurement instrument.
Figure 5B:
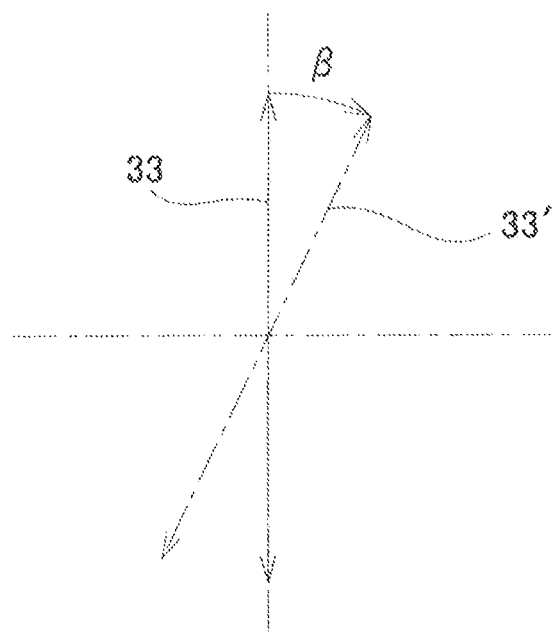
FIG. 5B is an explanatory diagram illustrating tilt of a path of rangefinder light.

Next, a description follows regarding a second embodiment of the invention, with reference to FIG. 4, FIG. 5A, and FIG. 5B. Note that the same reference signs are appended in FIG. 4 to equivalent parts to those of FIG. 1, and description thereof is omitted.

In the second embodiment, a laser remote length measurement instrument 1 includes a pair of optical prisms 28a, 28b serving as an optical axis deflection section. The optical prisms 28a, 28b are housed in a measurement device body 2.

The optical prisms 28a, 28b are each circular disk shaped, are disposed on the reception optical axis 16 and orthogonal to the reception optical axis 16, are superimposed on each other, and are disposed parallel to each other. A Fresnel prism is employed as each of the optical prisms 28a, 28b because this is preferable in order to make a more compact instrument.

Central portions of the optical prisms 28a, 28b serve as a rangefinding light axis deflection section through which rangefinding light 13 passes, and portions of the optical prisms 28a, 28b other than the central portions serve as a reflected rangefinding light axis deflection section through which reflected rangefinder light 18 passes.

The Fresnel prisms employed as the optical prisms 28a, 28b each have a plate shaped profile. The optical prism 28a is configured by a prism element 29a and multiple prism elements 31a, and the optical prism 28b is configured by a prism element 29b and multiple prism elements 31b. The prism elements are formed parallel to each other. The prism elements 29a, 29b and the prism elements 31a, 31b each have the same optical properties.

The prism elements 29a, 29b configure the rangefinding light axis deflection section, and the prism elements 31a, 31b configure the reflected rangefinding light axis deflection section.

The Fresnel prisms may be manufactured from optical glass, or may be molded from an optical plastic material. Cheap Fresnel prisms can be manufactured in the case in which the Fresnel prisms is molded from an optical plastic material.

The optical prisms 28a, 28b are each disposed so as to be independently rotatable about the reception optical axis 16.

Each of the external profiles of the optical prisms 28a, 28b is a circular shape centered on the reception optical axis 16. The diameters of the optical prisms 28a, 28b are set so as to enable sufficient quantity of light to be acquired in consideration of the spread of the reflected rangefinder light 18.

Ring gears 32a, 32b are formed around the outer circumference of each of the optical prisms 28a, 28b. The optical prisms 28a, 28b are accordingly each individually rotatable by a motor (not illustrated) through a pinion (not illustrated) meshed with the ring gears 32a, 32b. Note that motors capable of detecting the rotation angle, or motors that rotate according to a drive input value, for example pulse motors, are employed as such motors. Alternatively, a rotation angle detector that detects a rotation amount (rotation angle) of the motor, such as an encoder, may be employed, and the rotation amount of the motor may be detected.

The motors for the optical prisms 28a, 28b are each independently controlled in terms of rotation direction, rotation amount, and rotation speed. The optical prisms 28a, 28b thereby deflect the emission optical axis 11 of the rangefinding light 13 to be emitted in an optional direction, and deflect the reception optical axis 16 of the received reflected rangefinder light 18 so as to be parallel to the emission optical axis 11.

Note that the projection lens 14, the rangefinding light axis deflection section, and the like configure a projection light optical system, and the reflected rangefinding light axis deflection section, the imaging lens 21, and the like configure a reception light optical system.

The visible rangefinding light 13 emitted from the light emitting element 12 is deflected along the emission optical axis 11 toward the measurement points by the prism elements 29a, 29b (the rangefinding light axis deflection section).

The reflected rangefinder light 18 that has been reflected from the measurement points is made incident on the measurement device body 2, and is received by the light receiving element 19 through the prism elements 31a, 31b (the reflected rangefinding light axis deflection section) and the imaging lens 21. A rangefinding unit 6 is configured to range-find the measurement points on the basis of the light reception signal generated by the light receiving element 19.

The rotation angles of the motors configured to rotate the optical prisms 28a, 28b are each input to a computation controller 7. The computation controller 7 computes the rotation position of the optical prisms 28a, 28b on the basis of the rotation angles of the motors. The computation controller 7 also computes the deflection angle and the deflection direction of the rangefinding light 13 on the basis of the refractive indexes and rotation positions of the optical prisms 28a, 28b. The computation results thereof are stored in a storage unit within the computation controller 7.

Next, a description follows regarding measurement operations of the laser remote length measurement instrument 1 in the second embodiment, with reference to FIG. 5A and FIG. 5B.

The prism elements 29a, 29b and the prism elements 31a, 31b are configured such that the maximum deflection angle, for example 20°, is obtained when the rotation positions (reference positions) of the optical prism 28a and the optical prism 28b coincide with each other. Further, the prism elements 29a, 29b and the prism elements 31a, 31b are configured such that the deflection angle is at a minimum, namely the deflection angle is 0°, and the optical axis of the laser beam to be emitted is parallel to the emission optical axis 11 when one of the optical prisms 28a, 28b is in a position rotated by 180° from the coincident position. The prism elements 29a, 29b are configured so as to be capable of scanning the measurement target object in a range of, for example, ±20°, or scanning a measurement target area, with the rangefinding light 13.

When the optical prisms 28a, 28b are rotated together as one in a state in which the positional relationship between the optical prism 28a and the optical prism 28b has been fixed (in a fixed state of the deflection angle obtained by the optical prism 28a and the optical prism 28b), the path drawn by the rangefinding light 13 passing through the optical prisms 28a, 28b is a circle centered on the emission optical axis 11.

Further, as illustrated in FIG. 5A, when the optical prism 28a and the optical prism 28b are rotated relative to each other, if the deflection direction of the optical axis deflected by the optical prism 28a is a deflection X and the deflection direction of the optical axis deflected by the optical prism 28b is a deflection Y, then the deflection of the optical axis by the optical prisms 28a, 28b is a combined deflection Z having an angular difference of 0 between the optical prisms 28a, 28b.

For example, when the optical prism 28a and the optical prism 28b are synchronized in opposite directions to each other and rotationally oscillated to-and-fro at equal speeds over equal angles, the laser remote length measurement instrument 1 can scan along a straight line with the rangefinding light 13 passing through the optical prisms 28a, 28b. Thus, by rotationally oscillating the optical prism 28a and the optical prism 28b to-and-fro in opposite directions to each other at equal speeds over equal angles, the laser remote length measurement instrument 1 can scan in the straight line path 33 along the combined deflection Z direction with the rangefinding light 13 as illustrated in FIG. 5A.

Moreover, as illustrated in FIG. 5B, the optical prism 28a and the optical prism 28b are rotated by an angular amount β with the emission optical axis 11 as the center. Namely, either the laser remote length measurement instrument 1 is tilted by β with respect to the emission optical axis 11, or the optical prisms 28a, 28b are rotated as one by β. By synchronizing the optical prism 28a and the optical prism 28b in opposite directions to each other and by rotationally oscillating the optical prism 28a and the optical prism 28b to-and-fro at equal speeds over equal angles in this state, a path 33' is formed which is inclined at β with respect to the path 33.

To measure the length of a measurement target object, similarly to in the first embodiment, two optional points of a measurement target object are set as a first measurement point 26 and a second measurement point 27, and the rotation angle and the inclination angle of the combined deflection Z direction of the optical prisms 28a, 28b are set such that the two ends of the path 33 coincide with the first measurement point 26 and the second measurement point 27.

The computation controller 7 computes the distance between the first measurement point 26 and the second measurement point 27 on the basis of the divergence angle between the first measurement point 26 and the second measurement point 27, which in turn has been computed on the basis of the distance to the first measurement point 26, the distance to the second measurement point 27, and the rotation angles of the optical prisms 28a, 28b. The computation controller 7 displays the computed distance between two first measurement point 26 and the second measurement point 27 on the display unit 9.

In the second embodiment too, to measure the distance between the first measurement point 26 and the second measurement point 27, adjusting the direction and tilt of the laser remote length measurement instrument 1, and adjusting the rotation angles of the optical prisms 28a, 28b such that the two ends of the path 33 coincide with the first measurement point 26 and the second measurement point 27, suffices.

Thus, even in cases in which measurement is made of a measurement target object in an unreachable position, the distance between two points can be measured in a non-contact manner without approaching the measurement target object, enabling operability to be improved.

Moreover, the tilt of the path 33 can be adjusted by rotating the optical prism 28a and the optical prism 28b as one by a predetermined angle. Thus, positional alignment can be achieved of the path 33 with the first measurement point 26 and the second measurement point 27 by rotating the optical prisms 28a, 28b as one while rotationally oscillating the optical prisms 28a, 28b in a fixed state of the laser remote length measurement instrument 1, enabling the operability to be improved.

Figure 6:
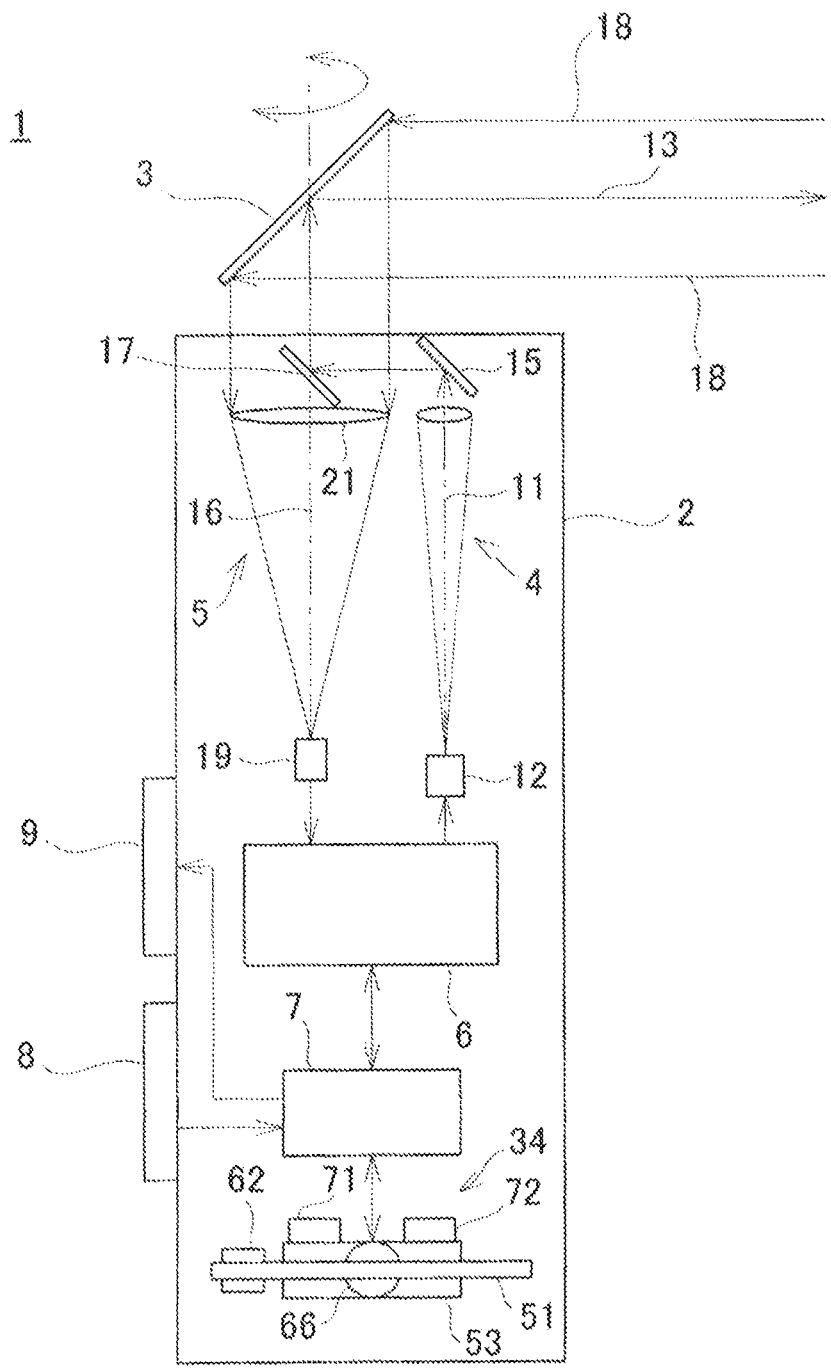
FIG. 6 is an outline diagram illustrating an optical system of a laser remote length measurement instrument according to a third embodiment of the invention.
Figure 7:
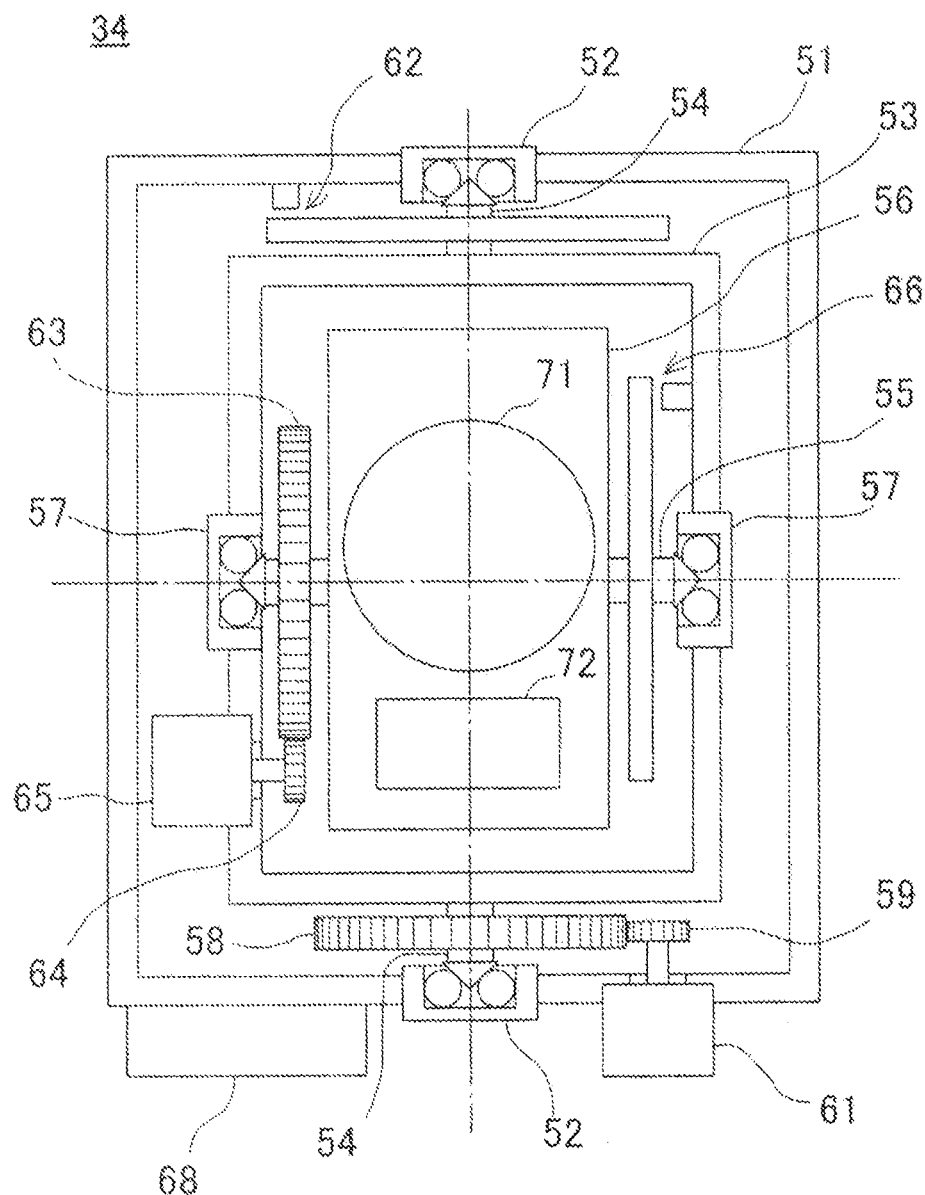
FIG. 7 is an outline plan view illustrating an orientation detection device.
Figure 8:
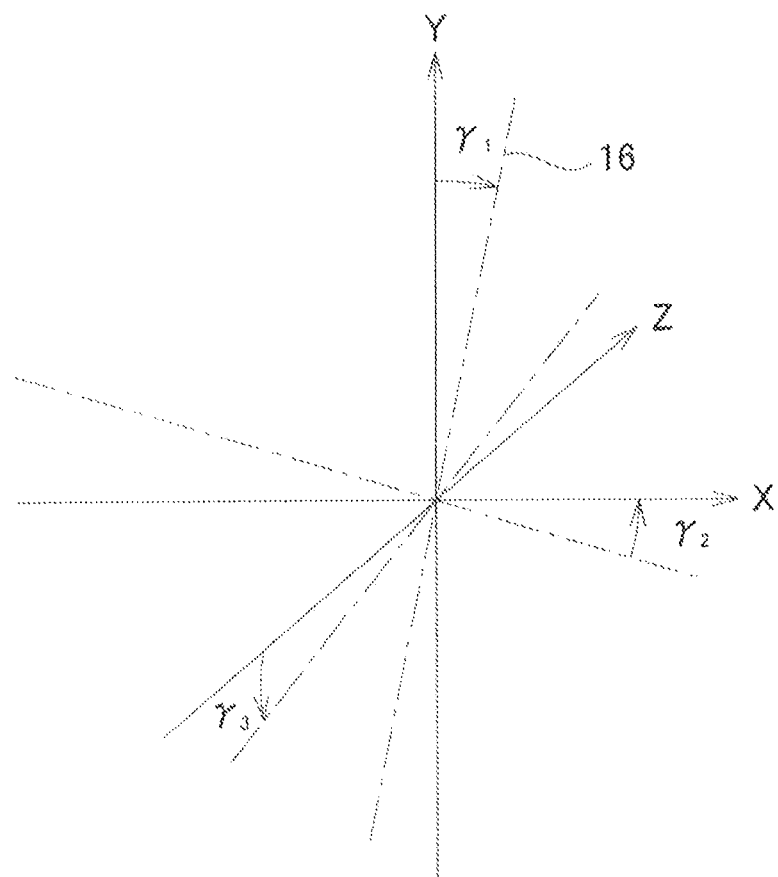
FIG. 8 is an explanatory diagram illustrating an inclination of the laser remote length measurement instrument with respect to the vertical.

A description follows regarding a third embodiment of the invention, with reference to FIG. 6 to FIG. 8. Note that the same reference signs are appended in FIG. 6 to equivalent parts to those of FIG. 1, and description thereof is omitted.

The third embodiment has a configuration in which a sensor capable of detecting at least the horizontal, for example an orientation detection device 34 having a gimbal mechanism, is provided to the laser remote length measurement instrument 1 of the first embodiment.

FIG. 7 illustrates details of the orientation detection device 34.

A rectangular frame shaped inner frame 53 is rotatably provided at the interior of a rectangular frame shaped outer frame 51 through shaft bearings 52 and a pair of first horizontal shafts 54. An inclination detection unit 56 is rotatably provided at the interior of the inner frame 53 through shaft bearings 57 and a second horizontal shaft 55.

The inner frame 53 is rotatable through 360° about the first horizontal shafts 54, and the inclination detection unit 56 is rotatable through 360° about the second horizontal shaft 55.

The inclination detection unit 56 is accordingly supported so as to be rotatable in two axial directions with respect to the outer frame 51, and the mechanism to rotatably support the inner frame 53 and the mechanism to rotatably support the inclination detection unit 56 configure a gimbal mechanism. The inclination detection unit 56 is supported by the gimbal mechanism with respect to the outer frame 51, such that the inclination detection unit 56 is not subject to any restrictions in rotation and is rotatable in all directions with respect to the outer frame 51.

A first driven gear 58 is fitted over an end portion of one of the first horizontal shafts 54, and a first drive gear 59 is meshed with the first driven gear 58. A first motor 61 is provided in a bottom face of the outer frame 51. The inner frame 53 is rotated by the first motor 61, through the first drive gear 59 and the first driven gear 58.

A first encoder 62 is provided near the other of the first horizontal shafts 54. The first encoder 62 detects the rotation angle of the inner frame 53 about the first horizontal shafts 54 with respect to the outer frame 51.

A second driven gear 63 is fitted over an end portion of the first horizontal shaft 55, and a second drive gear 64 is meshed with the second driven gear 63. A second motor 65 is provided at a side face of the inner frame 53 (the left side face in FIG. 7). The inclination detection unit 56 is rotated by the second motor 65 through the second drive gear 64 and the second driven gear 63.

A second encoder 66 is provided near another end portion of the second horizontal shaft 55. The second encoder 66 detects the rotation angle of the inclination detection unit 56 about the second horizontal shaft 55 with respect to the inner frame 53.

The rotation angles detected by the first encoder 62 and the second encoder 66 are input to an inclination computation processor 68.

The inclination detection unit 56 includes a first inclination sensor 71 and a second inclination sensor 72. The detection signals from the first inclination sensor 71 and the second inclination sensor 72 are input to the inclination computation processor 68.

The first inclination sensor 71 is a sensor that detects the horizontal at high precision and is, for example, an inclination detector that detects the horizontal using changes in the reflection angle of reflected light from detection light made incident on a horizontal liquid surface, or is a bubble tube that detects inclination by changes in position of an encapsulated bubble. Moreover, the second inclination sensor 72 is a sensor that detects inclination changes with high responsiveness, such as, for example, an acceleration sensor.

Note that the first inclination sensor 71 and the second inclination sensor 72 are both capable of individually detecting inclination about two axial directions, these being the rotation direction (inclination direction) detected by the first encoder 62 and the rotation direction (inclination direction) detected by the second encoder 66.

The inclination computation processor 68 computes the inclination angle and inclination direction on the basis of detection results from the first inclination sensor 71 and the second inclination sensor 72. The inclination computation processor 68 also computes the rotation angle of the first encoder 62 and the rotation angle of the second encoder 66 that correspond to the inclination angle and inclination direction. The computation results of the first encoder 62 and the second encoder 66 are input to the computation controller 7.

Note that the orientation detection device 34 is set such that the first inclination sensor 71 detects the horizontal in cases in which the outer frame 51 is placed horizontally, and also set such that the output of the first encoder 62 and the output of the second encoder 66 together indicate a reference position (rotation angle of 0°).

A description follows regarding operation of the orientation detection device 34.

First, a description follows regarding a case in which inclination is detected with high precision. Cases in which inclination is detected with high precision include, for example, cases in which the orientation detection device 34 is provided on an installation tripod, and cases not demanding responsiveness.

When the orientation detection device 34 is inclined, the first inclination sensor 71 outputs a signal according to the inclination.

The inclination computation processor 68 computes an inclination angle and inclination direction on the basis of the signal from the first inclination sensor 71. On the basis of the computation result, the inclination computation processor 68 then also computes rotation amounts of the first motor 61 and the second motor 65 in order to zero the inclination angle and inclination direction, and issues a drive command to drive the first motor 61 and the second motor 65 by these rotation amounts.

The first motor 61 and the second motor 65 are driven so that the orientation detection device 34 is inclined counter to the computed inclination angle and inclination direction. The drive amounts (rotation angles) of the first motor 61 and the second motor 65 are detected by the first encoder 62 and the second encoder 66, and driving of the first motor 61 and the second motor 65 is stopped when the rotation angles detected by the first encoder 62 and the second encoder 66 have become the computation result.

Moreover, the rotations of the first motor 61 and the second motor 65 are finely adjusted so that the first inclination sensor 71 detects the horizontal.

In this state, the inclination detection unit 56 is controlled to be horizontal while the outer frame 51 in an inclined state.

Thus, the inclination angle and inclination direction of the inner frame 53 and the inclination detection unit 56 inclined by the first motor 61 and the second motor 65 in order to make the inclination detection unit 56 horizontal are found on the basis of the rotation angles detected by the first encoder 62 and the second encoder 66.

The inclination computation processor 68 computes the inclination angle and inclination direction of the orientation detection device 34 on the basis of the detection results of the first encoder 62 and the second encoder 66 when the first inclination sensor 71 has detected the horizontal. This computation result indicates the orientation of the orientation detection device 34 after inclination.

The inclination computation processor 68 outputs the computed inclination angle and inclination direction to the computation controller 7 as a detection signal of the orientation detection device 34.

Next, a description follows regarding operation of the orientation detection device 34 in cases in which the orientation detection device 34 is installed in a portable instrument, and data is acquired in a portable state.

In a portable state, the orientation of the orientation detection device 34 changes every moment. Orientation detection is accordingly performed on the basis of the detection results of the highly responsive second inclination sensor 72.

The horizontal state is first detected using the first inclination sensor 71, changes in orientation are then found using the highly responsive second inclination sensor 72, and then orientation is detected on the basis of the detection results from the second inclination sensor 72. This control enables the inclination angle and inclination direction of the orientation detection device 34 to be detected in real time.

Moreover, the inclination detection unit 56 together with the inner frame 53 are also able to rotate through 360° or greater without restriction in the rotation of the inclination detection unit 56 and the inner frame 53. Namely, orientation detection can be made in all directions regardless of the orientation of the orientation detection device 34 (for example, even in cases in which the orientation detection device 34 has been inverted top-to-bottom).

Orientation detection is accordingly possible over a wide range and in all orientations without restriction in the measurement range of the inclination sensor.

The orientation is detected on the basis of the detection results of the second inclination sensor 72 in cases demanding high responsiveness. However, the second inclination sensor 72 generally has inferior detection precision to that of the first inclination sensor 71.

Both the high precision first inclination sensor 71 and the highly responsive second inclination sensor 72 are installed, and the detection result by the second inclination sensor 72 is calibrated using the detection result of the first inclination sensor 71. This thereby enables a high precision of orientation detection on the basis of the detection results of the second inclination sensor 72 alone.

Moreover, the first motor 61 and the second motor 65 are driven such that the inclination angle and the inclination direction are zeroed on the basis of the inclination angle and inclination direction detected by the second inclination sensor 72. Driving of the first motor 61 and the second motor 65 is also continued until the first inclination sensor 71 detects the horizontal. If a deviation arises between the values of the first encoder 62 and the second encoder 66 when the first inclination sensor 71 has detected the horizontal, namely the actual inclination angle and the inclination angle detected by the second inclination sensor 72, then the inclination angle of the second inclination sensor 72 can be calibrated on the basis of this deviation.

Thus, the inclination angle and inclination direction detected by the second inclination sensor 72 can be calibrated (corrected) by relationships, which is acquired in advance, between detected inclination angles of the second inclination sensor 72 and the inclination angles found on the basis of horizontal detection by the first inclination sensor 71 and detection results of the first encoder 62 and the second encoder 66. This enables the precision in the highly responsiveness orientation detection by the second inclination sensor 72 to be improved.

Moreover, when there is a large fluctuation in inclination or when there is a rapid change in inclination, the computation controller 7 controls the first motor 61 and the second motor 65 on the basis of signals from the second inclination sensor 72. Moreover, when there is a small fluctuation in inclination or when there is a gradual change in inclination, namely, when the first inclination sensor 71 is in a state capable of keeping up with a fluctuation in inclination or a change in inclination, the computation controller 7 controls the first motor 61 and the second motor 65 on the basis of signals from the first inclination sensor 71.

Note that comparison data, this being a data table representing comparison results between detection results of the first inclination sensor 71 and detection results of the second inclination sensor 72, is stored in the storage unit of the computation controller 7. In cases in which the first motor 61 and the second motor 65 are controlled on the basis of signals from the second inclination sensor 72, the computation controller 7 calibrates the detection results from the second inclination sensor 72 on the basis of the comparison data. The detection results by the second inclination sensor 72 can be raised to the detection precision of the first inclination sensor 71 by performing such calibration. Thus, high responsiveness can be implemented in the orientation detection by the orientation detection device 34, while high precision thereof is maintained.

The inclination angle and inclination direction are computed by combining the computed rotation angle of the first encoder 62 and the rotation angle of the second encoder 66. The inclination angle and inclination direction correspond to the inclination angle and inclination direction with respect to the vertical of the measurement device body 2 to which the orientation detection device 34 is attached.

In the third embodiment, the horizontal can be detected by the orientation detection device 34. Hence, as illustrated in FIG. 8, taking the X axis and the Z axis as two axes in horizontal directions, and the Y axis as an axis in the vertical direction, tilts $\gamma 2$, $\gamma 3$ of the measurement device body 2 can be detected in two directions with respect to the horizontal. Moreover, the direction of tilt and tilt $\gamma 1$ of the measurement device body 2 with respect to the vertical (Y axis) can be found by computation on the basis of the tilts $\gamma 2$, $\gamma 3$.

Thus, in cases in which two optional measurement points do not lie on the same horizontal line, the inclination angle of the path of rangefinding light between the two points with respect to the horizontal can be found on the basis of the detection results of the orientation detection device 34. Moreover, the horizontal distance between the two points and the vertical distance between the two points can be found on the basis of the inclination angle and the distance between the two points.

Moreover, by measuring the inclined distances between the laser remote length measurement instrument 1 and the measurement points, the horizontal distances and the vertical distances between the laser remote length measurement instrument 1 and the measurement points can be measured on the basis of the inclined distances and the inclination angle detected by the orientation detection device 34.

The third embodiment enables the horizontal distance and the vertical distance between two measurement points to be measured irrespective of the inclination of the measurement device body 2.

The vertical distance between a floor and ceiling can accordingly be measured by holding the laser remote length measurement instrument 1 horizontally, setting the rotation angle (deflection angle) of the scanning mirror 3 to 180°, and setting the floor and the ceiling as each of the measurement points.

Moreover, the horizontal distance between one wall and another wall can be measured by holding the laser remote length measurement instrument 1 vertically, setting the rotation angle of the scanning mirror 3 to 180°, and setting the one wall and the other wall as each of the measurement points.

Moreover, the tilt γ1 of the laser remote length measurement instrument 1 with respect to the vertical can be detected and the tilts γ2, γ3 of the laser remote length measurement instrument 1 with respect to the horizontal can be detected. Thus, by calibrating the measured values on the basis of the detected tilts γ2, γ3, the vertical distance between a floor and ceiling, and the horizontal distance between one wall and another wall, can be measured even in cases in which the laser remote length measurement instrument 1 is inclined.

Figure 9A:
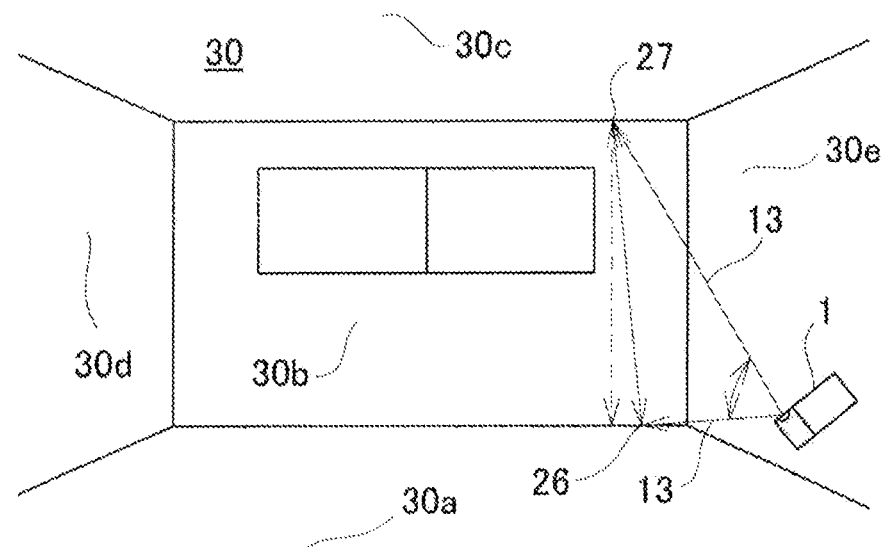
FIG. 9A is an explanatory diagram illustrating measurement of the vertical distance between a ceiling and a floor.

FIG. 9A illustrates a case in which, for a measurement target object 30, for example, a measurement point positioned at a boundary between a floor 30a and a front wall 30b of a structure is employed as the first measurement point 26, and a measurement point positioned at a boundary between a ceiling 30c and the front wall 30b of the structure is employed as the second measurement point 27. This illustrates a case in which the vertical distance between the first measurement point 26 and the second measurement point 27 is measured by the laser remote length measurement instrument 1.

To measure the distance between the first measurement point 26 and the second measurement point 27, the inclination angle of the laser remote length measurement instrument 1 with respect to the vertical is detected by the orientation detection device 34. The true vertical distance between the floor 30a and the ceiling 30c (illustrated by the broken line arrow in FIG. 9A) can be measured on the basis of the detected inclination angle. Namely, an accurate vertical distance between the floor 30a and the ceiling 30c can be measured by, in an optional orientation, measuring an optional measurement point on a boundary line between the floor 30a and the front wall 30b, and measuring an optional measurement point on a boundary line between the ceiling 30c and the front wall 30b.

Moreover, the vertical distance between the floor 30a and the ceiling 30c in FIG. 9A can be measured without setting the rotation angle (deflection angle) of the scanning mirror 3 to 180°, namely, without reversing the scanning mirror 3.

Figure 9B:
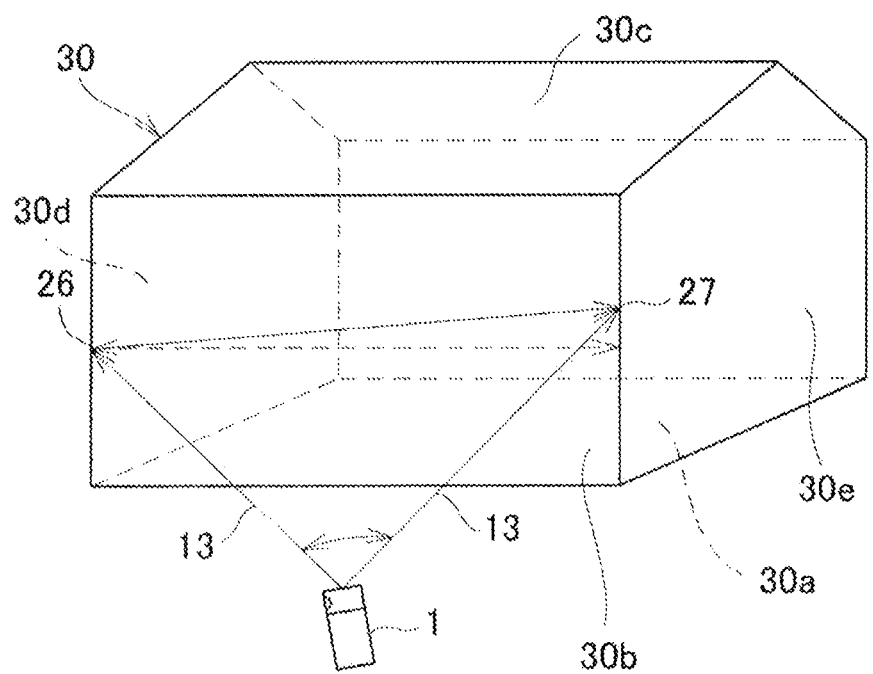
FIG. 9B is an explanatory diagram illustrating horizontal distance measurement between one side wall and another side wall.

FIG. 9B illustrates a case in which measurement points positioned at the boundaries of the front wall 30b and side walls 30d, 30e are employed as the first measurement point 26 and the second measurement point 27, and the horizontal distance between the first measurement point 26 and the second measurement point 27 is measured by the laser remote length measurement instrument 1.

In the case illustrated in FIG. 9B, to measure the distance between the first measurement point 26 and the second measurement point 27, the inclination angle of the laser remote length measurement instrument 1 with respect to the horizontal is detected by the orientation detection device 34. The true horizontal distance between the side walls 30d, 30e (illustrated by the broken line arrow in FIG. 9B) can be measured on the basis of the detected inclination angle.

Moreover, the horizontal distance between the side wall 30d and the side wall 30e can be measured without setting the rotation angle (deflection angle) of the scanning mirror 3 to 180°, namely, without reversing the scanning mirror 3.

Figure 10:
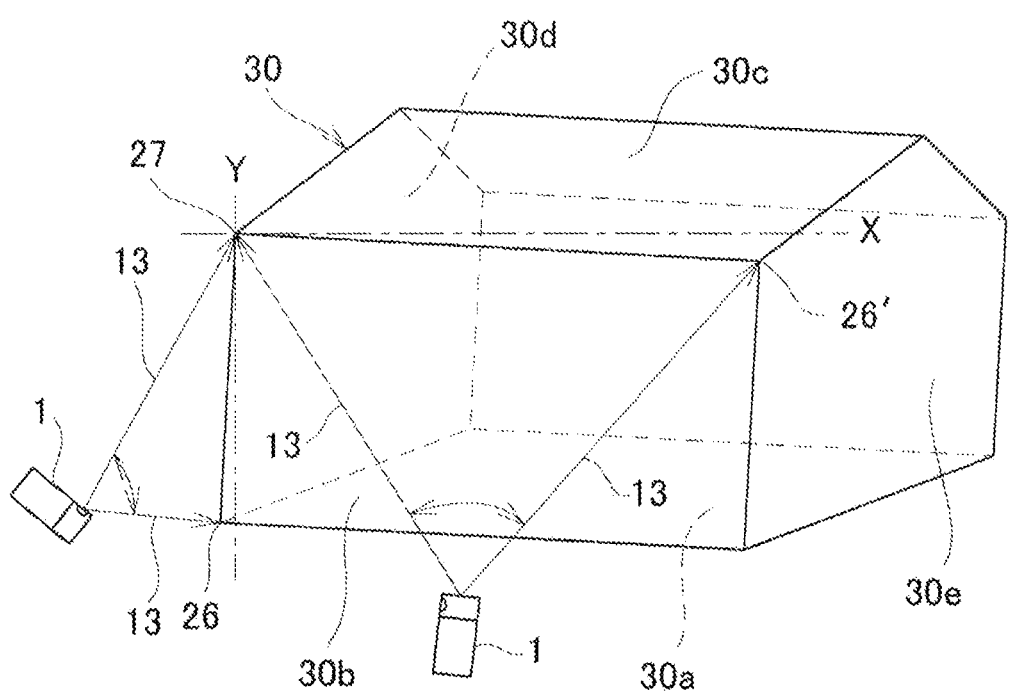
FIG. 10 is an explanatory diagram illustrating measurement of the lean of a measurement target object.

A description follows regarding measurement of the lean of the measurement target object 30 in FIG. 10. The intersection point between the floor 30a and the front wall 30b and the side wall 30d is employed as the first measurement point 26. The intersection point between the ceiling 30c and the front wall 30b and the side wall 30d is employed as the second measurement point 27. In cases in which the measurement target object 30 is scanned to-and-fro between the first measurement point 26 and the second measurement point 27 with the rangefinding light 13, the path of the rangefinding light 13 coincides with the boundary line between the front wall 30b and the side wall 30d.

Here, the tilt of the path with respect to a vertical line (Y axis) is detected using the orientation detection device 34, and as a result, the lean of the measurement target object 30 with respect to the vertical can be measured.

Moreover, consider a case in which: the intersection point between the ceiling 30c and the front wall 30b and the side wall 30e of the measurement target object 30 is employed as a first measurement point 26'; the intersection point of the ceiling 30c and the front wall 30b and the side wall 30d of the measurement target object 30 is employed as the second measurement point 27; and the measurement target object 30 is scanned to-and-fro between the first measurement point 26' and the second measurement point 27 with the rangefinding light 13. In such a case, the path of the rangefinding light 13 coincides with the boundary line between the ceiling 30c and the front wall 30b of the measurement target object 30.

Here, the tilt of the path with respect to a horizontal line (X axis) is detected using the orientation detection device 34, and as a result, the lean of the measurement target object 30 with respect to the horizontal can be measured.

Figure 11:
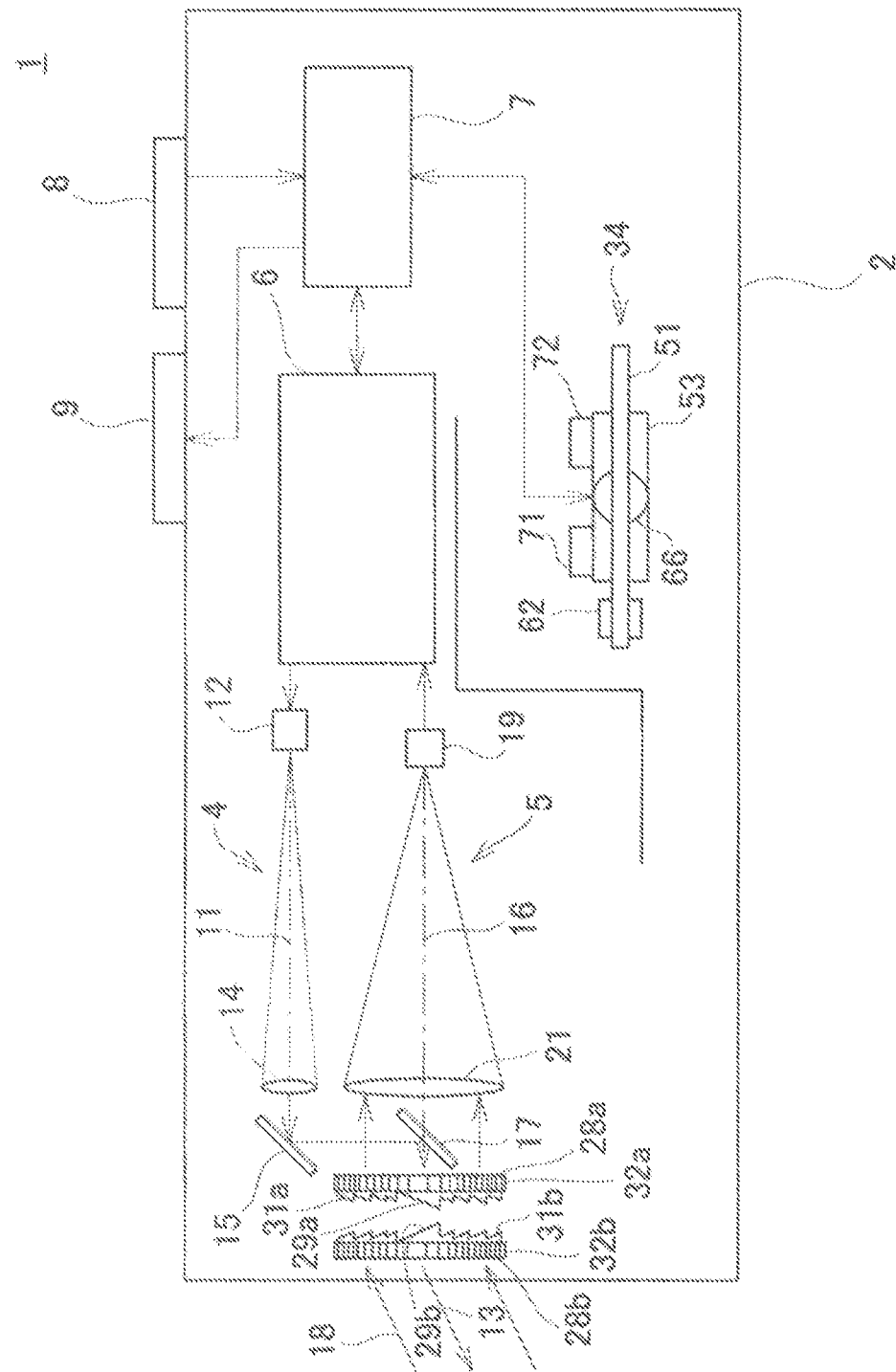
FIG. 11 is an outline diagram illustrating an optical system of a laser remote length measurement instrument according to a fourth embodiment of the invention.

Next, a description follows regarding a fourth embodiment of the invention, with reference to FIG. 11. Note that the same reference signs are appended in FIG. 11 to equivalent parts to those of FIG. 4 and FIG. 6, and description thereof is omitted.

The fourth embodiment is configured by providing a sensor capable of detecting at least the horizontal, for example, an orientation detection device 34, to the laser remote length measurement instrument 1 of the second embodiment.

In the fourth embodiment too, tilts γ2, γ3 of a measurement device body 2 with respect to two horizontal directions (see FIG. 8) and a tilt γ1 of the measurement device body 2 with respect to the vertical (see FIG. 8) can be detected using the orientation detection device 34.

Thus, in cases in which two optional measurement points do not lie on the same horizontal line, the inclination angle of the path of rangefinding light between the two points with respect to the horizontal can be found on the basis of the detection results of the orientation detection device 34. Moreover, the horizontal distance between the two points and the vertical distance between the two points can be found on the basis of the inclination angle and the distance between the two points.

Moreover, by measuring the inclined distances between the laser remote length measurement instrument 1 and the measurement points, the horizontal distances and the vertical distances between the laser remote length measurement instrument 1 and the measurement points can be measured on the basis of the inclined distances and the inclination angle detected by the orientation detection device 34.

Note that, similarly to in the third embodiment, the boundary between the floor and a wall is employed as the first measurement point 26 (see FIG. 9A) and the boundary between the ceiling and the wall is employed as the second measurement point 27 (see FIG. 9A), the distance between the first measurement point 26 and the second measurement point 27 is measured, and as a result, the vertical distance between the floor and the ceiling can be measure using the laser remote length measurement instrument 1.

Similarly, the boundaries between the front wall and side walls are employed as the first measurement point 26 (see FIG. 9B) and the second measurement point 27 (see FIG. 9B), the distance between the first measurement point 26 and the second measurement point 27 is measured. As a result, the horizontal distance between one side wall and another side wall can be measured using the laser remote length measurement instrument 1.

Figure 12:
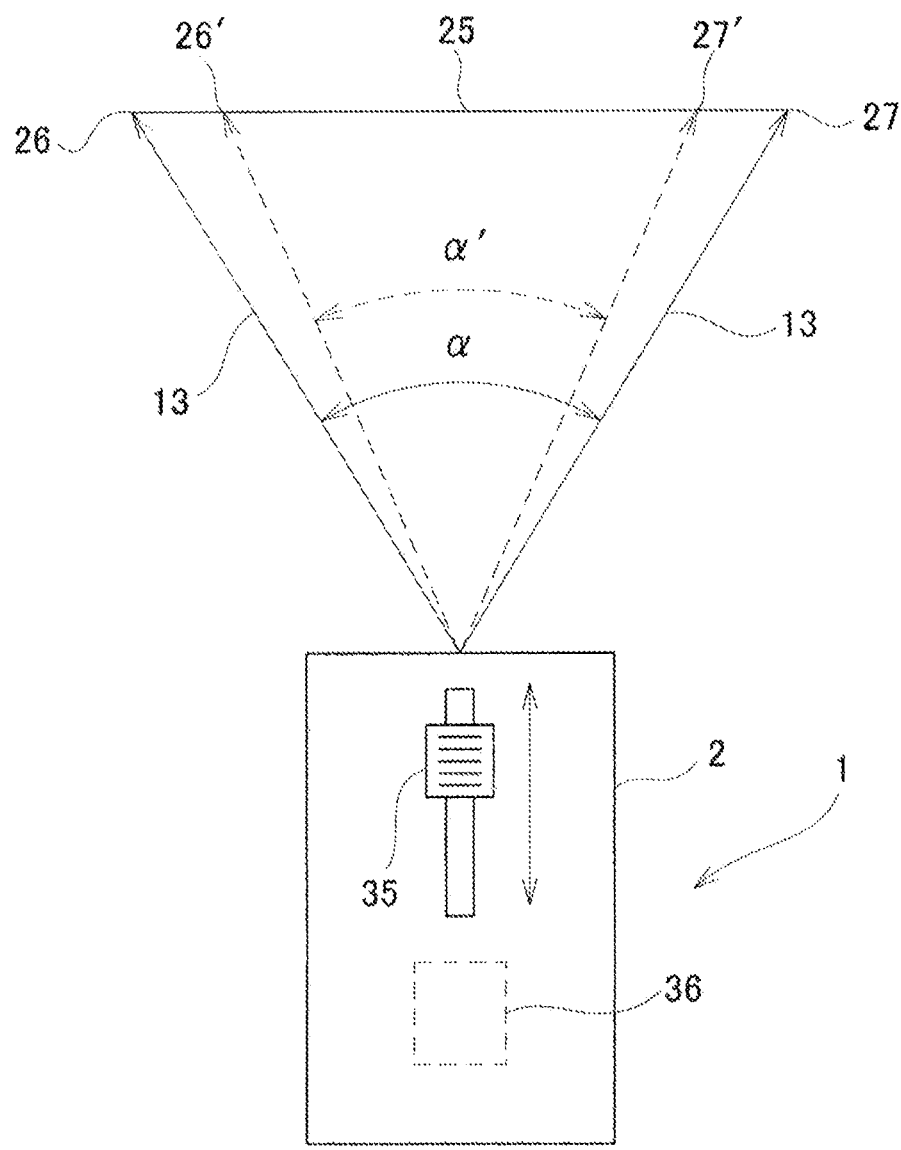
FIG. 12 is an outline diagram illustrating a laser remote length measurement instrument according to a fifth embodiment of the invention.

Next, a description follows regarding a fifth embodiment of the invention, with reference to FIG. 12.

In the fifth embodiment, a beam manipulation section 35 is provided to a measurement device body 2. The beam manipulation section 35 is slideable in a front-rear direction of the measurement device body 2. The measurement device body 2 also includes a displacement detector 36 configured to detect sliding displacement of the beam manipulation section 35. When the beam manipulation section 35 is slid, the displacement detector 36 detects the sliding displacement, and the detection result thereof is input to a computation controller 7 (see FIG. 1). The computation controller 7 increases or decreases the divergence angle of the rangefinding light 13 according to the sliding displacement. Namely, the computation controller 7 extends or reduces the length of a path 25 between a first measurement point 26 and a second measurement point 27.

For example, it is possible to increase or reduce the to-and-fro rotational oscillation angle of the scanning mirror 3 (see FIG. 1) by sliding the beam manipulation section 35 in cases in which the beam manipulation section 35 is applied to the first embodiment or the third embodiment.

Moreover, it is possible to increase or reduce the to-and-fro rotational oscillation angle of the optical prisms 28a, 28b (see FIG. 4) by sliding the beam manipulation section 35 in cases in which the beam manipulation section 35 is applied to the second embodiment or the fourth embodiment.

In the fifth embodiment, the length of the path 25 can be extended or reduced merely by sliding the beam manipulation section 35. This makes it easier to positionally align the two ends of the path 25 with the first measurement point 26 and the second measurement point 27 by eye, enabling the operability to be improved.

Note that although in the fifth embodiment, the beam manipulation section 35 is configured so as to be slideable frontward and rearward, the display unit 9 (see FIG. 1) may, for example, be configured by a touch panel, such that the length of the path 25 is extended or reduced by a sliding action on the display unit 9.

Moreover, an imaging unit may additionally be provided to the measurement device body 2, and the length of the path 25 may be extended or reduced using the beam manipulation section 35 on the basis of an imaging result displayed on the display unit 9

What is claimed is:

1. A laser remote length measurement instrument comprising:
   a rangefinding unit configured to cause a light emitting element to emit visible rangefinding light and obtain a light reception signal;
   an optical axis deflection section configured to scan to-and-fro between two directions with the rangefinding light, the optical axis deflection section including a pair of optical prisms that have a circular plate shape, are independently rotatable, and overlap with each other, each of the pair of optical prisms including
      a rangefinding light axis deflection section formed at a central portion of each of the pair of optical prisms and configured to deflect the rangefinding light at a required deflection angle and in a required direction, and
      a reflected rangefinding light axis deflection section formed at an outer circumferential portion of each of the pair of optical prisms and configured to deflect the reflected rangefinding light at a deflection angle and in a direction identical to those of the rangefinding light axis deflection section;
   a rotation angle detector configured to detect a divergence angle between the two directions; and
   a computation controller, the computation controller being configured to compute a distance between illuminated points in the two directions illuminated with the rangefinding light on the basis of rangefinding results for the illuminated points and the divergence angle between the two directions, wherein the computation controller independently rotates each of the pair of optical prisms.

2. The laser remote length measurement instrument according to claim 1, wherein:
   the optical axis deflection section is a scanning mirror; and
   the computation controller rotationally oscillates the scanning mirror to-and-fro at a required rotation angle.

3. The laser remote length measurement instrument according to claim 1, wherein each of the pair of optical prisms configuring the optical axis deflection section is a Fresnel prism.

4. The laser remote length measurement instrument according to claim 1, further comprising an orientation detection device capable of detecting an inclination angle and inclination direction with respect to a vertical or a horizontal.

5. The laser remote length measurement instrument according to claim 1, further comprising a beam manipulation section configured to increase or decrease the divergence angle between the two directions.

6. The laser remote length measurement instrument according to claim 1, wherein the computation controller continuously flashes the rangefinding light and scans with the rangefinding light.

7. The laser remote length measurement instrument according to claim 1, wherein the computation controller flashes the rangefinding light on and off and scans with the rangefinding light.

8. The laser remote length measurement instrument according to claim 1, wherein the computation controller only flashes the rangefinding light when the rangefinding light is at the illuminated points in the two directions.

9. The laser remote length measurement instrument according to claim 2, further comprising an orientation detection device capable of detecting an inclination angle and inclination direction with respect to a vertical or a horizontal.

10. The laser remote length measurement instrument according to claim 1, further comprising an orientation detection device capable of detecting an inclination angle and inclination direction with respect to a vertical or a horizontal.

11. The laser remote length measurement instrument according to claim 2, further comprising a beam manipulation section configured to increase or decrease the divergence angle between the two directions.

12. The laser remote length measurement instrument according to claim 1, further comprising a beam manipulation section configured to increase or decrease the divergence angle between the two directions.

13. The laser remote length measurement instrument according to claim 2, wherein the computation controller continuously flashes the rangefinding light and scans with the rangefinding light.

14. The laser remote length measurement instrument according to claim 1, wherein the computation controller continuously flashes the rangefinding light and scans with the rangefinding light.

15. The laser remote length measurement instrument according to claim 3, wherein the computation controller continuously flashes the rangefinding light and scans with the rangefinding light.

16. The laser remote length measurement instrument according to claim 2, wherein the computation controller flashes the rangefinding light on and off and scans with the rangefinding light.

17. The laser remote length measurement instrument according to claim 1, wherein the computation controller flashes the rangefinding light on and off and scans with the rangefinding light.

18. The laser remote length measurement instrument according to claim 2, wherein the computation controller only flashes the rangefinding light when the rangefinding light is at the illuminated points in the two directions.

19. The laser remote length measurement instrument according to claim 1, wherein the computation controller only flashes the rangefinding light when the rangefinding light is at the illuminated points in the two directions.

* * * * *